(12) United States Patent
Dozier et al.

(10) Patent No.: US 12,388,245 B2
(45) Date of Patent: Aug. 12, 2025

(54) ADJUSTABLE LENGTH BUS BRIDGE FOR MODULAR SWITCHBOARD (71) Applicant: Schneider Electric USA, Inc., Andover, MA (US)

(72) Inventors: Steven Wayne Dozier, Murfreesboro, TN (US); Charles Wesley Travis, Jr., Murfreesboro, TN (US); Xavier Lifran, Franklin, TN (US); James Raymond Ramsey, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 288 days.

(21) Appl. No.: 18/010,142

(22) PCT Filed: Jul. 23, 2021

(86) PCT No.: PCT/US2021/043086
§ 371 (c)(1),
(2) Date: Dec. 13, 2022

(87) PCT Pub. No.: WO2022/020789
PCT Pub. Date: Jan. 27, 2022

(65) Prior Publication Data
US 2023/0127383 A1 Apr. 27, 2023

Related U.S. Application Data (60) Provisional application No. 63/055,927, filed on Jul. 24, 2020.

(51) Int. Cl.
H02G 5/00 (2006.01)
H02B 1/01 (2006.01)
(Continued)

(52) U.S. Cl.
CPC .............. *H02G 5/007* (2013.01); *H02B 1/012* (2013.01); *H02B 1/04* (2013.01); *H02B 1/056* (2013.01);
(Continued)

(58) Field of Classification Search
None
See application file for complete search history.

(56) References Cited

U.S. PATENT DOCUMENTS 3,031,521 A * 4/1962 Krauss ..................... H02G 5/06
174/88 B
3,346,776 A * 10/1967 Olashaw .................. H02B 1/36
361/608

(Continued)

FOREIGN PATENT DOCUMENTS

CA 2813004 A1 7/2019
EP 1921723 B1 5/2008
JP 11164415 A 6/1999

OTHER PUBLICATIONS

Translation of JPH11164415(IDS) (Year: 1999).*
(Continued)

Primary Examiner — Timothy J. Dole
Assistant Examiner — Muhammed Azam
(74) Attorney, Agent, or Firm — Troutman Pepper Locke LLP (57) ABSTRACT A modular switchboard provides an adjustable length bus bridge for electrically connecting two adjacent switchboards, where the length of the bus bridge can be adjusted on site if needed. The bus bridge comprises a first set of busbars, each being electrically insulated from one another, and a second set of busbars, each being electrically insulated from one another. The first and second sets of busbars are arranged such that the busbars in the first set of busbars and the busbars in the second set of busbars are slidable relative (Continued)

to one another to adjust a length of the bus bridge. A longitudinal slot is formed in each busbar in either the first or the second set of busbars, or both, to accommodate a through bolt in the bus bridge when the first and second set of busbars slide relative to one another.

20 Claims, 10 Drawing Sheets

(51) Int. Cl.
    *H02B 1/04*         (2006.01)
    *H02B 1/056*      (2006.01)
    *H02B 1/20*         (2006.01)
    *H02B 1/30*         (2006.01)
    *H02B 1/32*         (2006.01)
    *H02B 1/36*         (2006.01)
    *H02B 3/00*         (2006.01)
    *H02G 5/06*         (2006.01)

(52) U.S. Cl.
    CPC .............. *H02B 1/20* (2013.01); *H02B 1/306* (2013.01); *H02B 1/32* (2013.01); *H02B 1/36* (2013.01); *H02B 3/00* (2013.01); *H02G 5/06* (2013.01)

(56) References Cited

U.S. PATENT DOCUMENTS

| | | | | |
|---|---|---|---|---|
| 3,365,537 A * | 1/1968 | Fehr, Jr. | ................ | H02G 5/007 174/88 B |
| 3,376,377 A * | 4/1968 | Fehr, Jr. | ................ | H02G 5/007 174/88 B |
| 3,377,421 A * | 4/1968 | Erieson | ................ | H02G 5/06 359/485.05 |
| 3,384,854 A * | 5/1968 | Jorgensen | ............. | H02G 5/007 174/88 B |
| 3,458,647 A * | 7/1969 | Fouse | ................ | H02G 5/06 138/155 |
| 3,459,872 A * | 8/1969 | Shannon | ............... | H02G 5/007 174/88 B |
| 3,462,541 A * | 8/1969 | Wescott | ................ | H02G 5/007 174/88 B |
| 3,495,135 A * | 2/1970 | Paape | ................ | H02B 1/36 361/608 |
| 3,786,394 A * | 1/1974 | Koenig | ................ | H02G 5/007 174/88 B |
| 3,896,353 A * | 7/1975 | Burton | ................ | H02B 1/36 361/608 |
| 3,956,674 A * | 5/1976 | Farley | ................ | H02B 1/32 200/51.09 |
| 3,967,164 A * | 6/1976 | Valle | ................ | H02B 1/36 361/626 |
| 4,009,920 A * | 3/1977 | Hicks, Jr. | ............... | H02G 5/007 174/88 B |
| 4,096,628 A * | 6/1978 | Backskog | ........... | H02B 13/035 206/718 |
| 4,097,103 A * | 6/1978 | Krause | ................ | H02G 5/007 174/88 B |
| 4,112,249 A * | 9/1978 | Carlson | ................ | H02G 5/08 174/68.2 |
| 4,136,374 A | 1/1979 | Rosey et al. | | |
| 4,174,143 A * | 11/1979 | Hicks, Jr. | ............... | H02G 5/007 174/88 B |
| 4,627,680 A * | 12/1986 | Weimer | ................ | H02G 5/007 174/88 B |
| 4,646,198 A * | 2/1987 | Rich | ................ | H02B 1/056 361/627 |
| 4,679,120 A * | 7/1987 | Raabe | ................ | H02B 1/056 361/647 |
| 4,720,769 A * | 1/1988 | Raabe | ................ | H02B 1/42 361/825 |
| 4,849,581 A * | 7/1989 | Larkin | ................ | H02G 5/007 174/68.2 |
| 4,950,841 A * | 8/1990 | Walker | ................ | H01R 25/162 174/68.2 |
| 5,119,268 A * | 6/1992 | Brown | ................ | H02G 5/06 361/601 |
| 5,783,779 A * | 7/1998 | Graham | ............... | H02G 5/007 174/88 B |
| 5,785,542 A * | 7/1998 | Johnson | ............... | H02G 5/007 439/213 |
| 5,821,464 A * | 10/1998 | Graham | ............... | H02G 5/06 174/88 B |
| 6,038,130 A * | 3/2000 | Boeck | ................ | H02B 1/052 361/732 |
| 6,430,035 B2 * | 8/2002 | Skold | ................ | H02B 1/52 361/600 |
| 6,739,682 B2 * | 5/2004 | Shih | ................ | H05K 7/1421 312/334.4 |
| 7,209,343 B2 * | 4/2007 | Remmert | ............... | H02B 1/056 361/652 |
| 7,718,895 B2 * | 5/2010 | Rodriguez | ............. | H02G 5/007 174/68.2 |
| 8,378,219 B2 * | 2/2013 | Lesieur | ................ | H02G 5/007 174/70 B |
| 8,540,526 B2 * | 9/2013 | Mooney | ................ | H02G 5/007 439/213 |
| 8,697,993 B2 * | 4/2014 | Jur | ............. | H02G 5/06 174/68.2 |
| 8,711,549 B2 * | 4/2014 | Rodrigues | ................ | H02G 5/10 174/68.2 |
| 8,900,002 B2 * | 12/2014 | Mooney | ................ | H02G 5/007 439/212 |
| 9,190,791 B1 * | 11/2015 | Jaena | ................ | H01R 25/162 |
| 9,450,387 B2 * | 9/2016 | Faber | ................ | H02B 1/20 |
| 9,472,369 B2 * | 10/2016 | Dozier | ................ | H02P 1/26 |
| 9,590,405 B1 * | 3/2017 | Maurer | ................ | H01R 25/145 |
| 9,590,406 B1 * | 3/2017 | Maurer | ................ | H02G 5/007 |
| 9,705,299 B1 * | 7/2017 | Maurer | ................ | H02G 5/007 |
| 9,705,300 B1 * | 7/2017 | Maurer | ................ | H02G 5/007 |
| 9,728,922 B2 * | 8/2017 | Carera | ................ | H01R 31/06 |
| 9,882,366 B2 * | 1/2018 | Maurer | ................ | H02B 1/21 |
| 9,929,549 B2 * | 3/2018 | Witherbee | ............ | F16M 13/022 |
| 10,027,095 B1 * | 7/2018 | Kallmeyer | ................ | H02B 3/00 |
| 10,396,536 B2 * | 8/2019 | Zhu | ................ | H01R 4/40 |
| 10,439,342 B2 * | 10/2019 | Wynnik | ................ | H02G 5/002 |
| 10,570,891 B2 * | 2/2020 | Alefelder | ................. | H02G 5/06 |
| 10,971,877 B2 * | 4/2021 | Zhu | ................ | H01R 43/00 |
| 11,183,827 B1 * | 11/2021 | Butala | ................ | F16M 13/027 |
| 11,398,718 B2 * | 7/2022 | Mruczek | ................ | H02G 5/007 |
| 11,764,560 B2 * | 9/2023 | O'Neill | ................ | H02G 5/00 200/238 |
| 12,119,625 B2 * | 10/2024 | Travis, Jr. | ............. | H01H 71/08 |
| 2012/0014039 A1 | 1/2012 | Keegan et al. | | |
| 2014/0216780 A1 * | 8/2014 | Yanniello | ................ | H02G 5/06 174/95 |
| 2017/0201082 A1 * | 7/2017 | Maurer | ................ | H02G 5/007 |
| 2023/0127383 A1 * | 4/2023 | Dozier | ................ | H02B 1/012 174/88 B |
| 2023/0170673 A1 * | 6/2023 | Dozier | ................ | H02B 1/04 361/601 |

OTHER PUBLICATIONS

Extended Search Report for EP App. No. 21847233.0 dated Jun. 19, 2024, 15 pages.
Search Report and Written Opinion for International Application No. PCT/US2021/043086 dated Nov. 4, 2021.
International Search Report and Written Opinion mailed Nov. 4, 2021 in corresponding International Application No. PCT/US2021/043086, 11 pages.

* cited by examiner

ADJUSTABLE LENGTH BUS BRIDGE FOR MODULAR SWITCHBOARD

CROSS-REFERENCE TO RELATED APPLICATIONS

The present application claims the benefit of priority to U.S. Provisional Application No. 63/055,927, entitled "Modular Switchboard," filed Jul. 24, 2020, which is incorporated herein by reference.

FIELD OF THE INVENTION

The present invention relates generally to apparatuses and methods for providing a modular switchboard and, more particularly, to an apparatus and method for providing a bus bridge having an adjustable length for connecting one modular switchboard to another modular switchboard.

BACKGROUND OF THE INVENTION

Conventional factory-assembled switchboards typically come in a relatively limited number of configurations, and generally such factory assembled switchboards require a significant number of electrical busbars, usually made of copper, which can be very expensive. A fully assembled switchboard can also be very large and very heavy, which means shipping the switchboard to the installation site can be expensive, and maneuvering to its final location at the installation site can be very difficult. A fully assembled switchboard can also be more difficult for installers to wire since some installed components may block or restrict access to areas of the switchboard where electrical connections must be made.

Having the ability instead to assemble the switchboard partly or completely at the installation site provides installers with increased flexibility, for example, to effect recent customer changes or updates. For instance, a switchboard component that can be made to accommodate multiple different types of switchboard configurations or multiple different switchboard size requirements at the installation site would provide additional installation options for installers. Most existing switchboards, however, have components that are fixed and cannot be adjusted on site by the installers.

Thus, a need exists for an improved switchboard having one or more switchboard components that can be adjusted on site if needed.

SUMMARY OF THE DISCLOSED EMBODIMENTS

The embodiments disclosed herein relate to apparatus and method for a modular switchboard having one or more switchboard components that can be adjusted on site if needed. In particular, the apparatus and method provide an adjustable length bus bridge for electrically connecting two adjacent switchboards, where the length of the bus bridge can be adjusted on site if needed. The bus bridge comprises a first set of busbars, each being electrically insulated from one another, and a second set of busbars, each being electrically insulated from one another. Each busbar in the first set of busbars has a connection end connectable to a first switchboard, and each busbar in the second set of busbars has a connection end connectable to a second switchboard. The first and second sets of busbars are arranged such that the busbars in the first set of busbars and the busbars in the second set of busbars are slidable relative to one another to adjust a length of the bus bridge. A longitudinal slot is formed in each busbar in either the first set of busbars or the second set of busbars, or both, to accommodate a through bolt in the bus bridge when the first set of busbars and the second set of busbars slide relative to one another.

The bus bridge also includes a housing for enclosing the first and second sets of busbars, the housing having a first section and a second section, the first and second sections being configured such that the first section is slidably received within the second section, permitting the housing to expand and contract longitudinally, either the first or second section defining a longitudinal slot therein, the defined slot being positioned to coincide with the longitudinal slot in the first or second set of busbars. The bus bridge further includes a through bolt passing through the longitudinal slot of the first or second housing section and the longitudinal slot of the first or second set of busbars, the bolt, when tightened, compresses the busbars of the first set of busbars with the busbars of the second set of busbars, thereby making a tight electrical connection between the busbars of the first set of busbars with the busbars of the second set of busbars.

In general, in one aspect, the disclosed embodiments relate to a bus bridge for electrically connecting adjacent switchboards and other electrical distribution devices. The bus bridge comprises, among other things, an adjustable length housing, and a plurality of adjustable length phase members housed within the adjustable length housing, each adjustable length phase member spaced apart and parallel to an immediately adjacent adjustable length phase member. The bus bridge further comprises an insulation barrier positioned in between adjacent adjustable length phase members, the insulation barrier electrically isolating adjacent adjustable length phase members from one another. The plurality of adjustable length phase members has a length that is adjustable by up to a predefined minimum amount and a predefined maximum amount.

In general, in another aspect, the disclosed embodiments relate to a modular electrical distribution device for distributing electrical power in a facility. The electrical distribution device comprises, among other things, a generally rectangular frame, a line bus attached to the generally rectangular frame, and a bus bridge connected to the line bus. The bus bridge has a length that is adjustable by up to a predefined minimum amount and a predefined maximum amount.

In general, in still another aspect, the disclosed embodiments relate to a method of electrically connecting adjacent electrical distribution devices. The method comprises, among other things, connecting a bus bridge to a first electrical distribution device, adjusting a length of the bus bridge sufficient to reach a second electrical distribution device adjacent to the first electrical distribution device, and connecting the bus bridge to the second electrical distribution device. The bus bridge comprises an adjustable length housing, and a plurality of adjustable length phase members housed within the adjustable length housing, each adjustable length phase member spaced apart and parallel to an immediately adjacent adjustable length phase member. The bus bridge further comprises an insulation barrier positioned in between adjacent adjustable length phase members, the insulation barrier electrically isolating adjacent adjustable length phase members from one another.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation decisions to achieve the developer's ultimate goal for the commercial embodiment. Such implementation may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
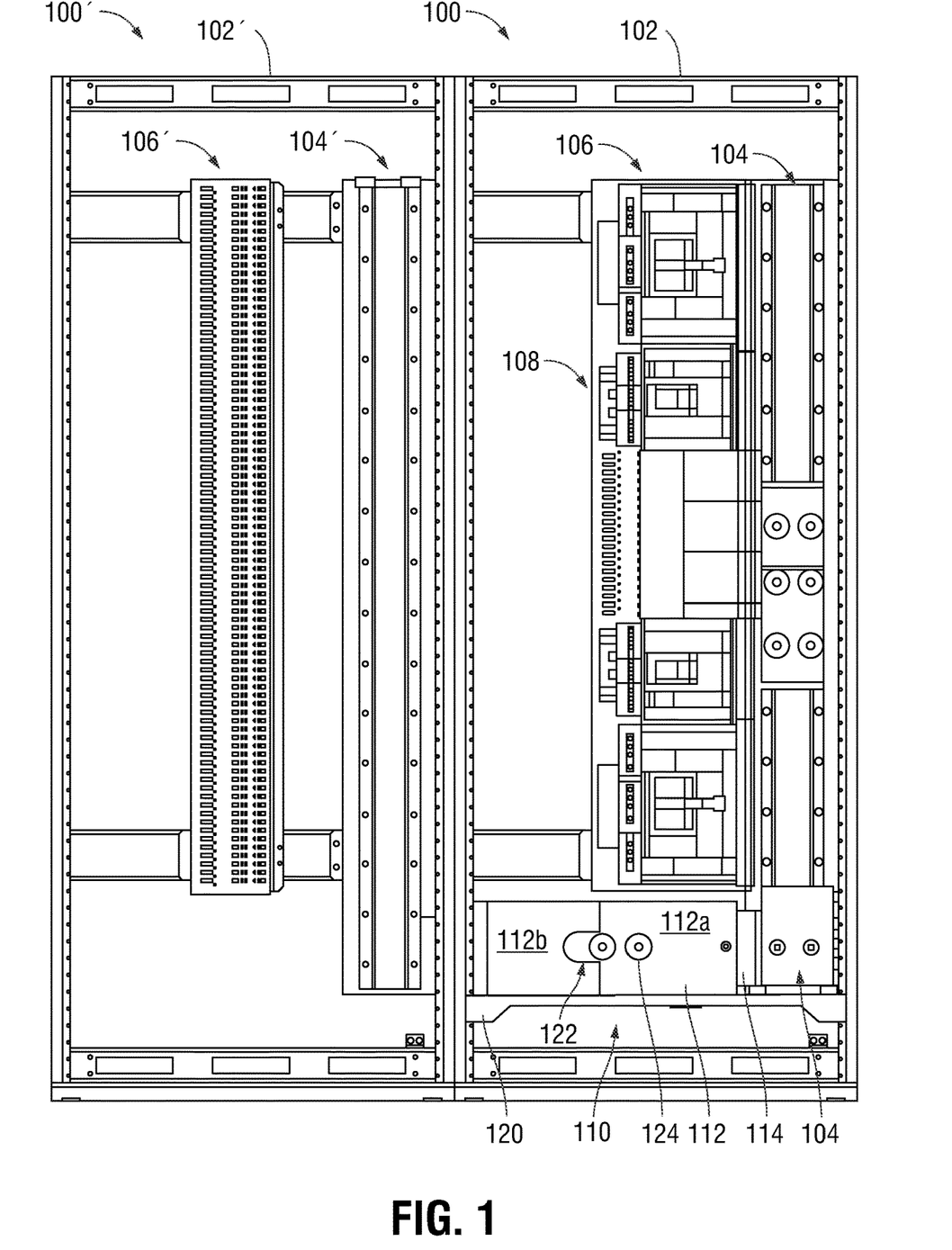
FIG. 1 is a front view of an exemplary modular switchboard according to some implementations of the disclosed embodiments.

Referring now to FIG. 1, a front view of an exemplary modular switchboard 100 is shown that may be used to distribute electrical power in a facility, such as a building, a plant, a manufactory, and the like. More specifically, FIG. 1 shows the modular switchboard 100 in a partially assembled state, without an outer covering, so the interior can be viewed. Note that although a switchboard is specifically discussed herein, those having ordinary skill in the art will appreciate that embodiments of the present disclosure may also be used with other types of electrical distribution devices, such as switchgears, distribution panels, and the like.

As can be seen, the modular switchboard 100 has a generally rectangular chassis or frame 102, a line bus 104, and a breaker panel 106 installed therein, among other things. The line bus 104 and breaker panel 106 extend generally parallel to a long axis of the frame 102 and are secured to and supported by the frame 102. The line bus 104 in this example is an I-Line bus of the type available from Schneider Electric USA, Inc., although other types of line buses may be used. The breaker panel 106 is also generally rectangular in this example and has a series of regularly spaced holes (not labeled) formed along a face thereof. One or more circuit breakers 108 or other circuit interrupt devices are mounted on the breaker panel 106 in electrical connection to the line bus 104. Each circuit breaker 108 in turn can be electrically connected to a respective branch circuit (not shown) for carrying electrical power from the line bus 104 to a part of the facility.

Depending on the type of facility, several switchboards like the modular switchboard 100 may be needed to meet the electrical power requirements of the facility. In that case, a second modular switchboard 100' may be provided in the facility adjacent to the exemplary modular switchboard 100. The second modular switchboard 100' is also shown only partially assembled here, including a generally rectangular chassis or frame 102', a line bus 104', and a breaker panel 106'. A bus bridge 110 may then be installed in the exemplary modular switchboard 100 to connect the line bus 104 to the second modular switchboard 100'. The bus bridge 110, as the name suggests, provides a pathway that bridges electrical power from the exemplary modular switchboard 100 to the second modular switchboard 100'.

In accordance with embodiments of the present disclosure, the bus bridge 110 is adjustable, having an overall length that can be made longer or shorter as needed to connect the exemplary modular switchboard 100 to the second modular switchboard 100'. This adjustability permits the length of the bus bridge 110 to be compressed by up to a preset minimum amount for easy transport and subsequent installation at an installation site. Once at the installation site, the bus bridge 110 can be connected to the exemplary modular switchboard 100, then expanded as needed by up to a preset maximum amount to connect the exemplary modular switchboard 100 to the second modular switchboard 100'.

As FIG. 1 shows, the adjustable bus bridge 110 has a generally rectangular housing 112 and a first insulating shroud 114 extending from one end (e.g., right end) of the housing 112. The insulating shroud 114 is a type often used in the switchboard art to facilitate connection between a line bus and other components commonly found in a switchboard. This connection may be through direct contact with the line bus 104 in some embodiments, or the connection may be through an intermediate interface, such as a joint pack that is then connected to the line bus 104. In a similar manner, a second insulating shroud 116, more clearly seen in FIG. 2, extends from the other end (e.g., left end) of the housing 112 to facilitate connection of the adjustable bus bridge 110 to the line bus 104' of the second modular switchboard 100'. In some embodiments, a support platform 120 is provided in the modular switchboard 100 to support and secure the adjustable bus bridge 110 to the frame 102 of switchboard 100.

Referring still to FIG. 1, the housing 112 is an adjustable length housing composed of two juxtaposed sections in some embodiments: a first section 112a that is fastened to the first insulating shroud 114, and a second section 112b that is fastened to the second insulating shroud 116. Any suitable fastening means (e.g., screws, etc.) may be used to fasten the first and second housing sections 112*a*, 112*b* to the first and second insulating shrouds 114, 116. The two housing sections 112*a*, 112*b* may have roughly the same length in some embodiments, although this is not strictly required. In either case, the two housing sections 112*a*, 112*b* are arranged so as to be slidable toward and away from each other when assembled, overlapping one another as needed so that one section is received partly in the other section. The ability of the two housing sections 112*a*, 112*b* to slide back and forth relative to each other in an overlapping manner allows the overall length of the housing 112, and consequently the adjustable bus bridge 110, to be adjusted.

In the example shown, a longitudinal opening 122 is formed on a front surface of at least one of the housing sections, for example, the second section 112*b*. The longitudinal opening 122 extends parallel to the housing 112 and has a size and shape that can accommodate a through bolt 124 (or top portion thereof) to allow the housing sections 112*a*, 112*b* to slide back and forth with little or no interference from the through bolt 124 (or top portion thereof). A single through bolt 124 may be used in some embodiments, but preferably two such through bolts 124 are used to better clamp or otherwise hold together the various components of the adjustable bus bridge 110, as explained later herein.

Figure 2:
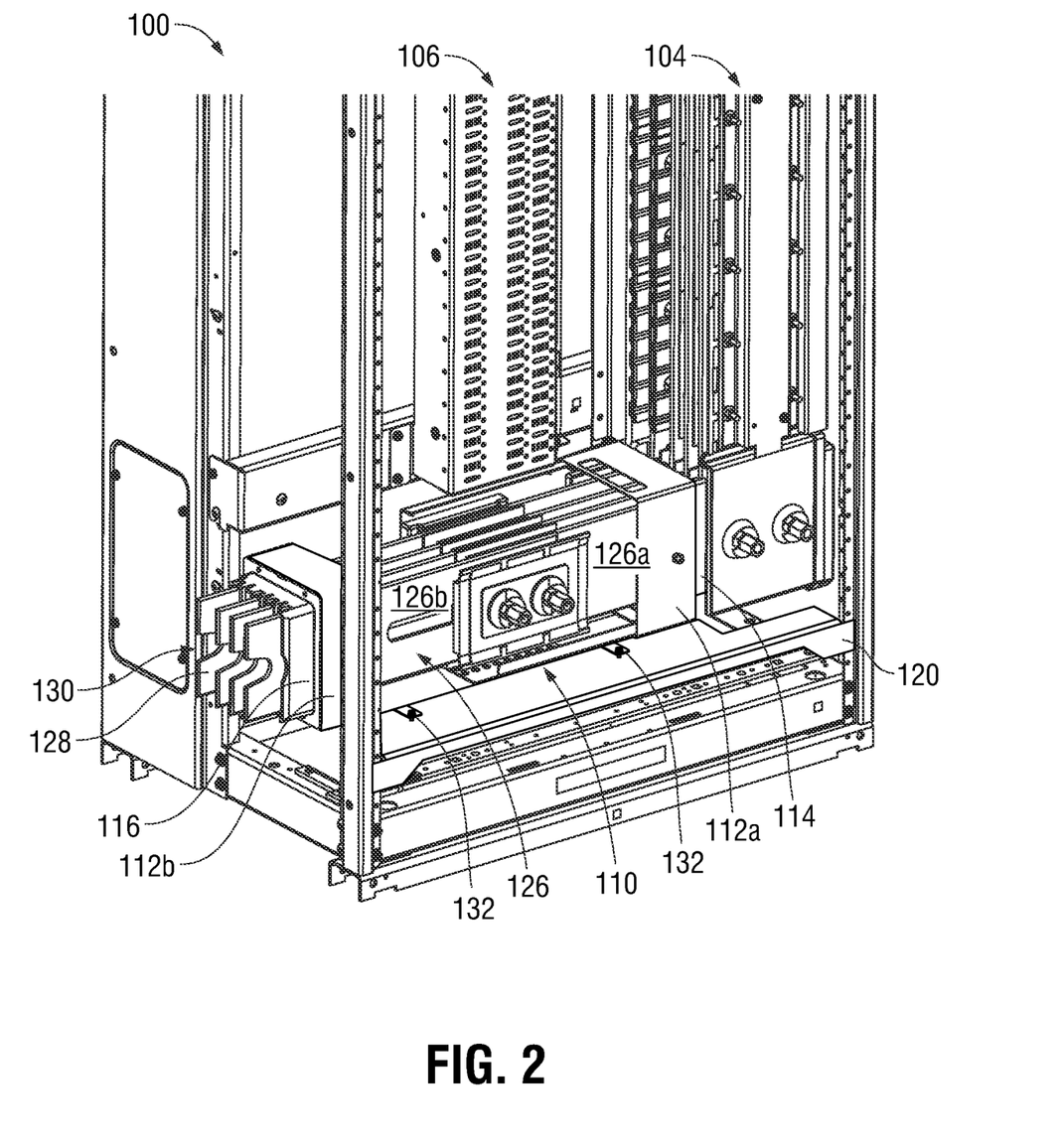
FIG. 2 is a perspective view of the exemplary modular switchboard according to some implementations of the disclosed embodiments.

Referring now to FIG. 2, a perspective view of the interior of the modular switchboard 100 is shown in which the housing 112 has been partially removed to reveal the inside of the adjustable bus bridge 110. As can be seen, a plurality of electrically conductive phase members, one of which is indicated at 126, are enclosed within the adjustable bus bridge 110. There are four phase members 126 in this example, but fewer or more phase members 126 may be present depending on the number of electrical phases needed at the facility (e.g., 1-phase, 2-phase, 3-phase, etc.). Each phase member 126 is generally planar and spaced apart in parallel from an immediately adjacent phase member 126 by an electrical insulation barrier, better seen in FIG. 5.

Like the housing 112, each phase member 126 is an adjustable length phase member composed of two generally rectangular busbars in some embodiment: a first busbar 126*a* proximate to the first housing section 112*a*, and a second busbar 126*b* proximate to the second housing section 112*b*, when assembled. Similar to the housing 112, the two busbars 126*a*, 126*b* may have roughly equal lengths in some embodiments, although again this is not strictly required. In either case, the two busbars 126*a*, 126*b* are arranged to be slidable toward and away from each other when assembled, with their interior ends overlapping along a middle overlap region (better seen in FIG. 5) of the phase member 126. The ability of the busbars 126*a*, 126*b* to slide back and forth relative to each other allows the length of the phase members 126, and thus the adjustable bus bridge 110, to be adjusted.

The type of busbars 126*a*, 126*b* shown in FIG. 2 are commonly known as bolt-on busbars in that each busbar has a connection end 128 having a notch 130 formed therein for receiving a bolt. The connection ends 128 of the busbars 126 typically protrude from the insulating shrouds 114, 116 such that a bolt may be easily inserted through the notches 130 and tightened to clamp the connection ends 128 to the intended connections. Alternatively, plug-on busbars may be used in some embodiments that employ spring jaws embedded in the insulating shrouds to make the intended connections, as discussed later herein.

One or more mounting tabs 132 may be provided on the housing 112 for securing the adjustable bus bridge 110 to the support platform 120. For example, a mounting tab 132 may be provided close to or flush with the support platform 120 on opposite sides of each housing section 112*a*, 112*b*. A screw, locking pin, or other fastener (not expressly labeled) may then be used with the mounting tabs 132 to secure the housing 112, and therefore the bus bridge 110, to the support platform 120.

Figure 3:
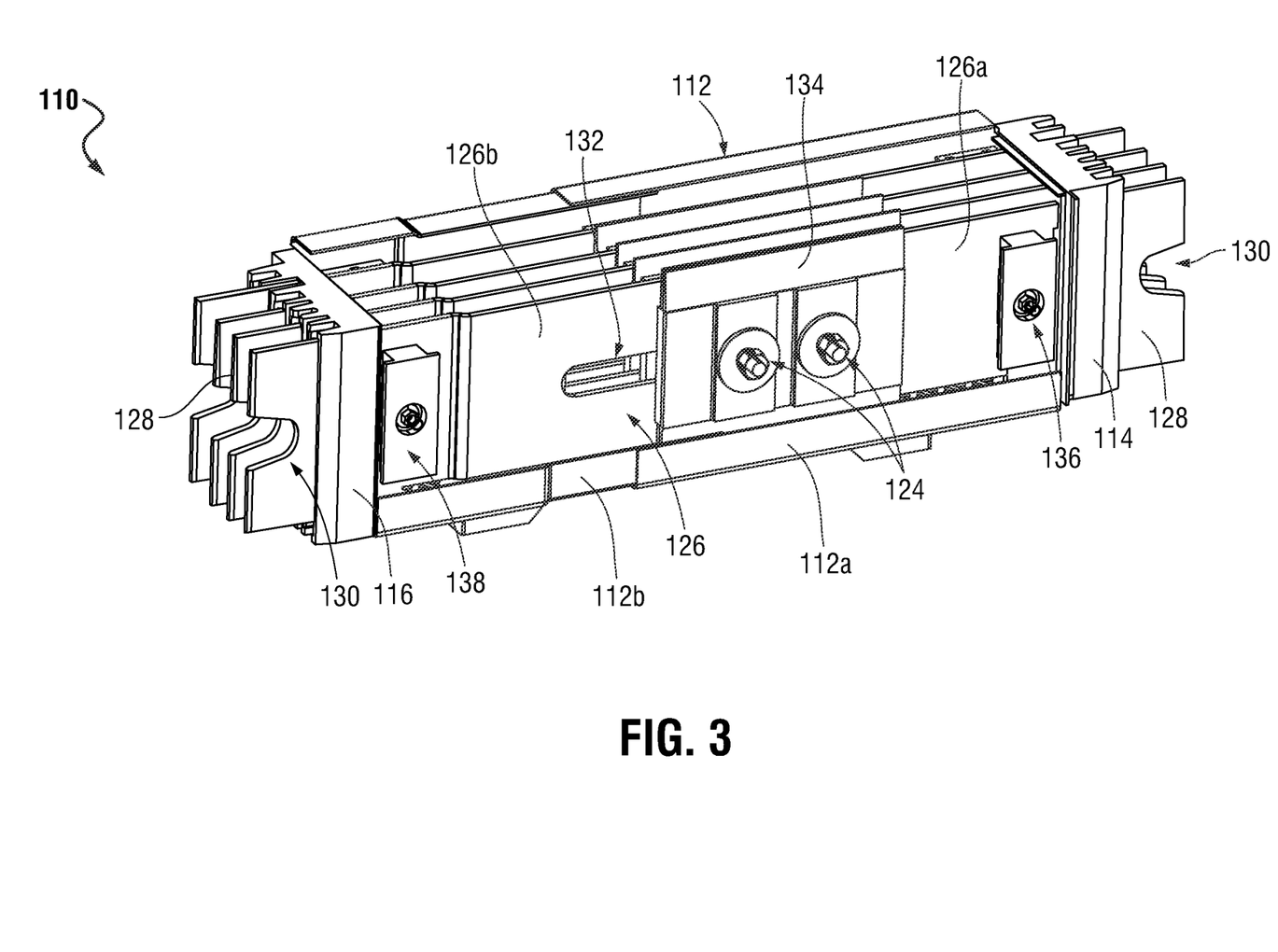
FIG. 3 is a perspective view of an exemplary bus bridge according to some implementations of the disclosed embodiments.

FIG. 3 shows a perspective view of an exemplary implementation of the adjustable bus bridge 110, again with the housing 112 partially removed to expose the interior of the bus bridge 110. As this view shows, a longitudinal slot 132 is formed in at least one of the busbars 126*a*, 126*b*, for example, the second busbar 126*b*, as shown, for each phase member 126. The longitudinal slot 132 extends parallel to the busbar 126*b* and has a size and shape that can receive the through bolts 124 (or top portions thereof) therein. The longitudinal slot 132 allows the busbars 126*a*, 126*b* to slide back and forth relative to each other with little or no interference from the through bolts 124 (or top portions thereof). Note that two through bolts 124, laterally aligned and longitudinally offset from one another, are used in this implementation instead of a single through bolt to better prevent undesirable swiveling of the busbars 126*a*, 126*b* relative to one another.

Figure 5:
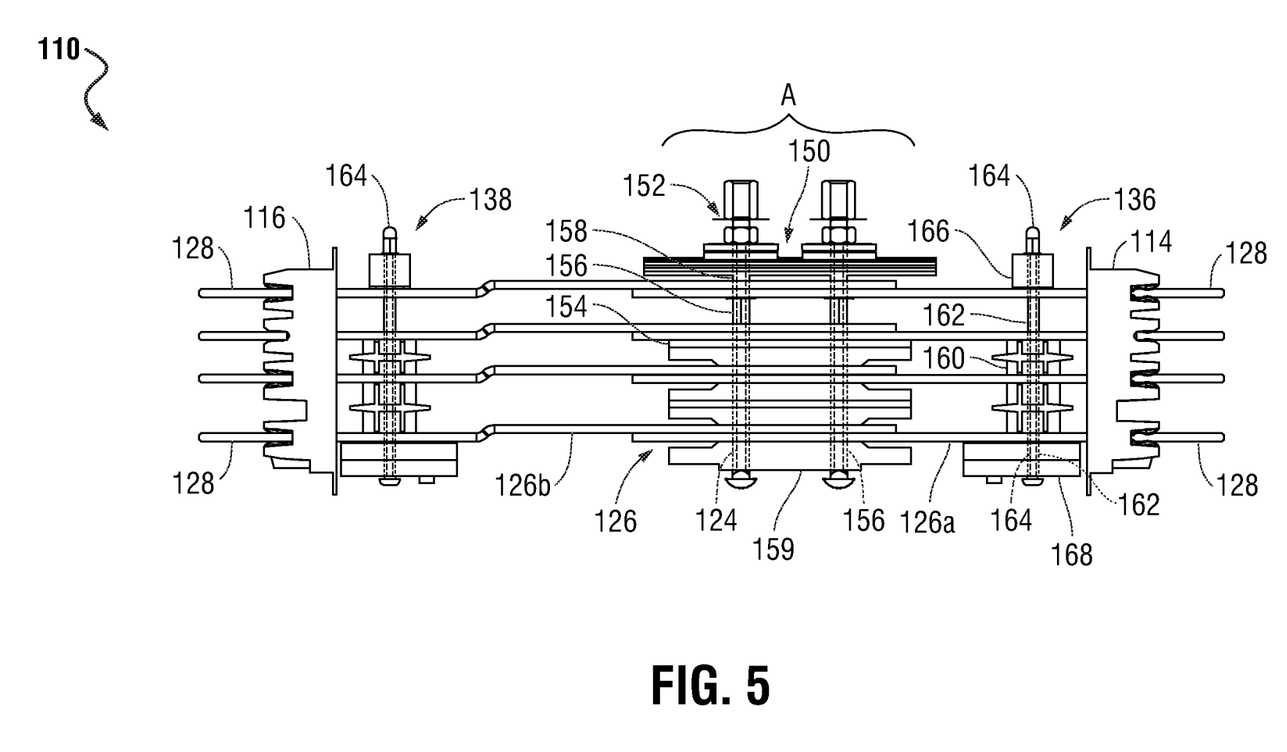
FIG. 5 is a top view of the exemplary bus bridge according to some implementations of the disclosed embodiments.

In some embodiments, a generally rectangular isolation plate 134 is disposed between the nuts on the bolts 124, better seen in FIG. 5, and an immediately adjacent (i.e., topmost) phase member 126. When assembled, the isolation plate 134 extends over the middle overlap region of the phase member 126 where the two busbars 126*a*, 126*b* overlap, and serves to electrically insulate the phase member 126 from the tops of the bolts 124 and any other intervening components (e.g., washers, etc.) that may be present. Although difficult to see in this view, a similar isolation plate may be similarly disposed between each phase member 126 and an immediately adjacent phase member 126.

In some embodiments, two end clamp assemblies may be provided respectively to support the connection ends 128 of the busbars 126*a*, 126*b*: a first clamp assembly 136 adjacent to the first insulating shroud 114, and a second clamp assembly 138 adjacent to the second insulating shroud 116. The clamp assemblies 136, 138 function to secure the connection ends 128 of the busbars 126*a*, 126*b* to the bus bridge 110 and to maintain their separation from each other. A clamp bolt (better seen in FIG. 5) may then be disposed through each clamp assembly 136, 138 and tightened to fix the connection ends 128 of the busbars 126*a*, 126*b* in place within the bus bridge 110.

Figure 4:
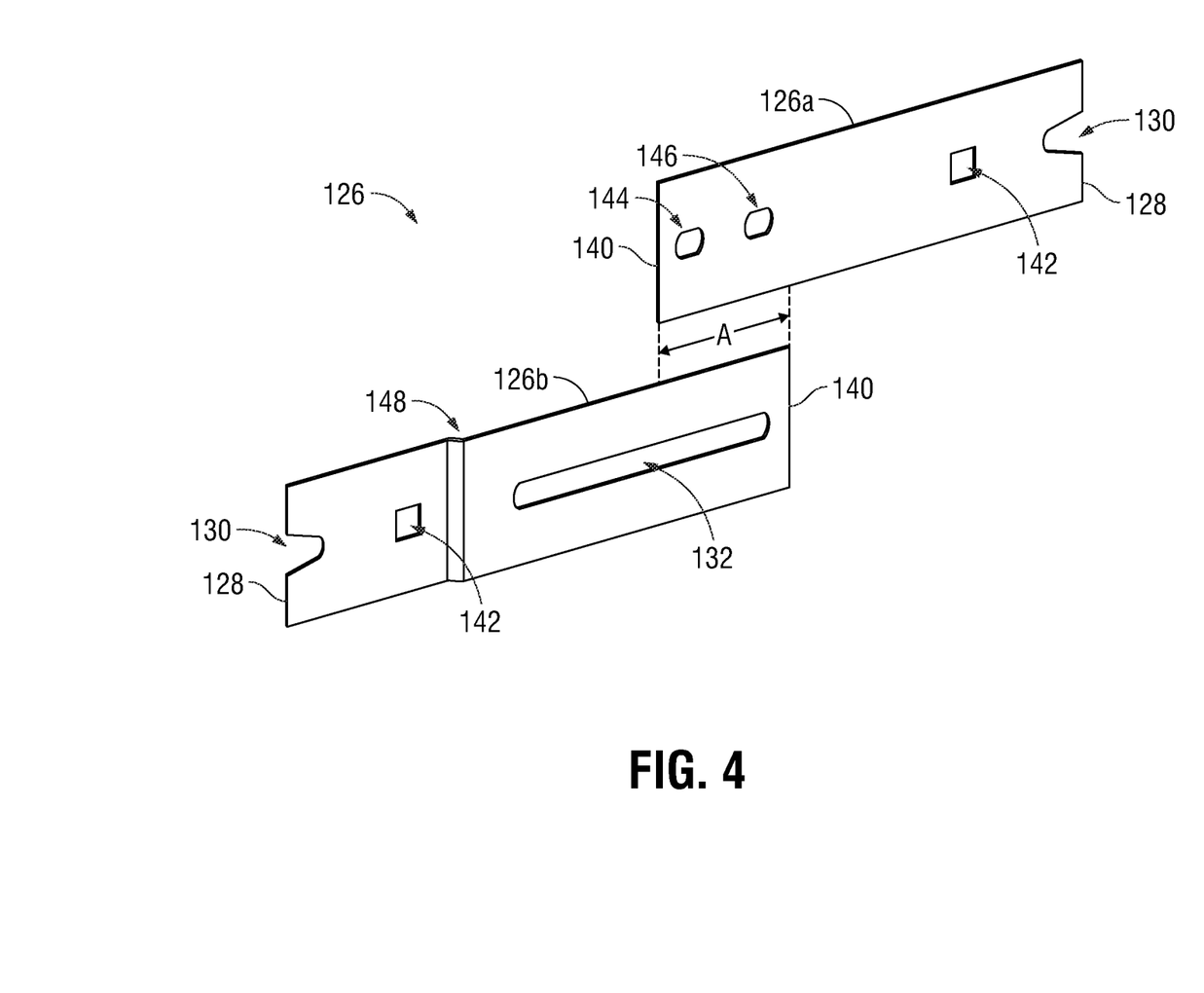
FIG. 4 is a perspective view of exemplary busbars according to some implementations of the disclosed embodiments.

FIG. 4 shows a perspective view of the individual busbars 126*a*, 126*b* making up a phase member 126. From this view, the longitudinal slot 132 in the second busbar 126*b* can be seen starting near the interior end 140 and extending longitudinally toward the connection end 128. The length of the longitudinal slot 132 is predefined and may be selected as needed for a particular application of the bus bridge 110. An aperture 142 is formed in the second busbar 126*b* near the connection end 128 for receiving the clamp bolt of the second clamp assembly 138 mentioned above. A similar aperture 142 is formed in the first busbar 126*a* near the connection end 128 for receiving the clamp bolt of the first clamp assembly 136. Two additional apertures 144, 146 may be formed in the first busbar 126*a* near the interior end 140 for receiving the through bolts 124. Alternatively, instead of the apertures 144, 146, a longitudinal slot may be formed in the first busbar 126*a* similar to the longitudinal slot 132 in the second busbar 126*b* to receive the through bolts 124, in some embodiments.

When assembled, the busbars 126*a*, 126*b* overlap one another along a middle overlap region "A" of the phase member 126. This middle overlap region "A" has a minimum size that depends in large part on the longitudinal offset between the two through bolts 124, and a maximum size that depends in large part on the length of the longitudinal slot 132. In some implementations, depending on the thickness of the busbars 126a, 126b, the middle overlap region "A" may cause the two connection ends 128 of the busbars to be non-coplanar (i.e., lie in different planes). To compensate for this difference, if needed, a small bend or ridge 148 roughly equal to the thickness of a busbar may be formed in one of the busbars, for example the second busbar 126b, between the longitudinal slot 132 and the aperture 142.

Turning next to FIG. 5, a top view of the exemplary adjustable bus bridge 110 is shown, this time with the housing 112 removed entirely. In this view, the busbars 126a, 126b of the various phase members 126 can be seen overlapping along the middle overlap region "A" of each phase member 126, with the through bolts 124 extending through the busbars 126a, 126b within the middle overlap region. The busbars 126a, 126b are slidable as discussed above, until such time when the through bolts 124 are tightened. This arrangement of the through bolts 124 and the busbars 126a, 126b together forms a type of slidable joint 150 that allows the length of the bus bridge 110 to be adjusted.

Once the length of the adjustable bus bridge 110 is set to a desired length, the slidable joint 150 may be tightened to prevent further sliding of the busbars 126a, 126b. Tightening of the slidable joint 150 may be accomplished via nuts, one of which is indicated 152, on the through bolts 124. The nuts 152 may be standard bolt nuts in some embodiments, or one or both nuts 152 may be a torque-specific dual-nut arrangement, such as the VISI-TITE® nut available from Schneider Electric USA, Inc. The latter type has a top nut attached to a bottom nut such that turning the top nut also turns the bottom nut until a preset amount of torque is reached, at which point the top nut breaks off, ensuring that the bottom nut has been torqued by the specified amount.

Also seen here is the insulation barrier mentioned in FIG. 1, indicated at 154, that electrically separates immediately adjacent phase members 126. In some embodiments, the insulation barrier 154 may resemble the type of insulation barriers commonly used in joint packs, busways, and the like, to maintain busbar separation. Such an insulation barrier 154 is normally disposed between each set of immediately adjacent phase members 126 to electrically separate the phase members. In the present view, however, the insulation barrier 154 between the topmost phase member 126 and the immediately adjacent phase member 126 has been omitted to better show that an insulated bolt sleeve 156 (dotted lines) extends through the various phase members 126. Each through bolt 124 (dashed lines) may then be inserted through a respective bolt sleeve 156 to protect and prevent the bolts 124 from direct contact with any phase member 126.

An insulated spacer 158 may be disposed between the topmost phase member 126 and the isolation plate 134 to maintain electrical separation therebetween in some embodiments. Conversely, an insulated base 159 may be disposed adjacent to the bottommost phase member 126 to maintain electrical separation between that phase member 126 and other components in the adjustable bus bridge 110.

A similar arrangement to the above may be used for each of the clamp assemblies 136, 138 in some embodiments. In particular, an insulation plate 160 is disposed between each set of immediately adjacent phase members 126 to electrically separate the phase members. But in the present view, the insulation plate 160 between the topmost phase member 126 and the immediately adjacent phase member 126 has been omitted to more clearly show that an insulated bolt tubing 162 (dotted lines) extends through the various phase members 126. A clamp bolt 164 (dashed lines) may then be inserted through the bolt tubing 162 of each clamp assembly 136, 138 to prevent and protect the bolts 164 from direct contact with any phase member 126.

An insulated top plate 166 may be disposed between the top of each clamp bolt 164 and the topmost phase member 126 to maintain electrical separation therebetween in some embodiments. An insulated bottom plate 168 may be disposed adjacent to the bottommost phase member 126 to maintain electrical separation between that phase member 126 and other components in the adjustable bus bridge 110 in some embodiments.

The adjustable bus bridge 110 as shown is an example of a kit that is designed to allow easy installation within the modular switchboard 100 at the installation site rather than at a factory. Similar kits may also be provided for other components of the modular switchboard 100, then assembled at the installation site to complete the modular switchboard 100. For example, the line bus 104 and the breaker panel 106 may each be in the form of a kit. The use of one or more kits like the adjustable bus bridge 110 beneficially reduces the number of components that have to be factory preinstalled in the modular switchboard 100.

Figure 6:
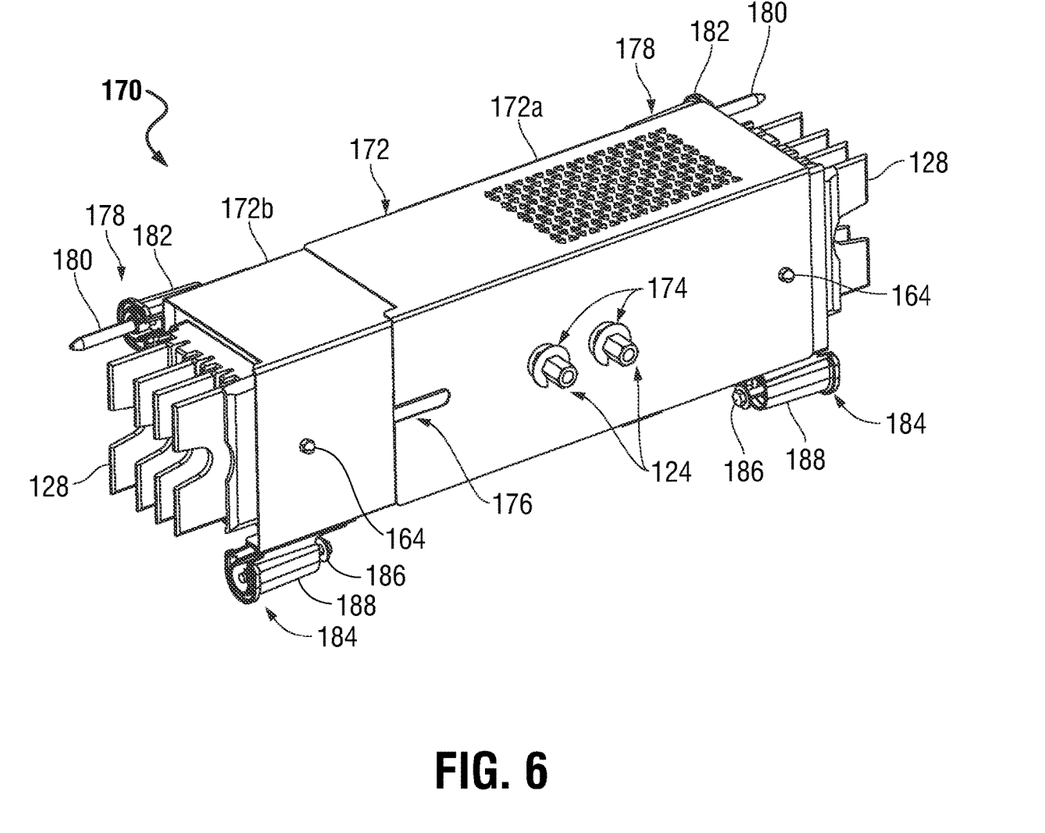
FIG. 6 is a perspective view of an alternative bus bridge according to some implementations of the disclosed embodiments.

FIG. 6 is a perspective view of an alternative adjustable bus bridge 170 according to embodiments of the present disclosure. The alternative bus bridge 170 is similar in most respects to the adjustable bridge 110 from FIG. 1, except a different housing 172 is used. The housing 172, like the one from FIG. 1, is a non-unitary housing composed of two juxtaposed sections in some embodiments: a first housing section 172a and a second housing section 172b. The two housing sections 172a, 172b are arranged so as to be slidable toward and away from each other when assembled, overlapping one another as needed. This slidability allows the overall length of the housing 172, and thus the adjustable bus bridge 110, to be adjusted. The two housing sections 172a, 172b may have roughly the same length in some embodiments, or one may be longer than the other in some embodiments, depending on the particular implementation.

Bolt holes 174 are formed in the first housing section 172a in the present example to accommodate the through bolts 124 of the adjustable bus bridge 170. A longitudinally-extending open-ended slot 176 may also be formed in the first housing section 172a, with the open end opening away from the bolt holes 174. The open-ended slot 176 is in lateral alignment with the clamp bolt 164 protruding from the second housing section 172b, and is sized to receive the clamp bolt 164 when the two housing sections 172a, 172b slide toward each other, thereby avoiding any interference by the clamp bolt 164. The longitudinally-extending open-ended slot 176 may be formed in the second housing section 172b in some embodiments.

In some embodiments, an alignment mechanism 178 is provided on the housing 172 to ensure proper alignment of the alternative adjustable bus bridge 170 within the modular switchboard 110 when installing the bus bridge 170 in the switchboard 110. The alignment mechanism 178 in the example shown is composed mainly of a guide pin 180 extending from a pin holder 182 generally in parallel to the housing 172. The pin holder 182 is designed to support and hold the guide pin 180 securely in place while the guide pin 180 is inserted into an alignment hole (shown in FIG. 7) in the modular switchboard 110 to properly align the bus bridge 170 in the switchboard 110 (i.e., put the connection ends 128 in position to establish a connection). Other alignment mechanisms may also be used, such as a guide pin mounted directly to the housing, within the scope of the disclosed embodiments.

In some embodiments, a fastening mechanism 184 is provided on the housing 172 to ensure secure fastening of the adjustable bus bridge 170 to the modular switchboard 110 when installing the bus bridge 170 in the switchboard 110. The fastening mechanism 184 in these embodiments mainly includes a screw or other threaded fastener 186 and a retainer 188 designed to hold the screw 186 generally in parallel to the housing 172. When the bus bridge 170 is properly seated in the modular switchboard 110 (i.e., the connection ends 128 are positioned to establish a connection), the screw 186 may be screwed into a threaded opening (shown in FIG. 7) in the switchboard 110 to fasten the bus bridge 170 to the switchboard 110.

In some embodiments, at least one alignment mechanism 178 is provided on each one of the housing sections 172a, 172b proximate to the connection ends 128 of the busbars 126a, 126b to facilitate connecting those ends 128 to the exemplary modular switchboard 100 and the second modular switchboard 100'. The specific location of the alignment mechanism 178 on the housing sections 172a, 172b is not overly important so long as there is a corresponding alignment hole on the switchboards 100, 100' for the alignment mechanism 178.

Similarly, in some embodiments, at least one fastening mechanism 184 is provided on each one of the housing sections 172a, 172b proximate to the connection ends 128 of the busbars 126a, 126b to facilitate fastening the bus bridge 170 to the exemplary modular switchboard 100 and the second modular switchboard 100'. The precise location of the fastening mechanism 184 on the housing sections 172a, 172b is again not particularly important as long as there is a corresponding threaded opening on the switchboards 100, 100' for the fastening mechanism 184.

In the example of FIG. 6, both the alignment mechanism 178 and the fastening mechanism 184 are provided on each one of the housing sections 172a, 172b, although this is not strictly required. In these embodiments, the alignment mechanism 178 and the fastening mechanism 184 are preferably located near diagonally opposite corners of the housing sections 172a, 172b. It is also possible to provide two alignment mechanisms 178 and two fastening mechanisms 184 on each one of the housing sections 172a, 172b, in which case all four corners of each housing section 172a, 172b would be occupied by one of these mechanisms.

Figure 7:
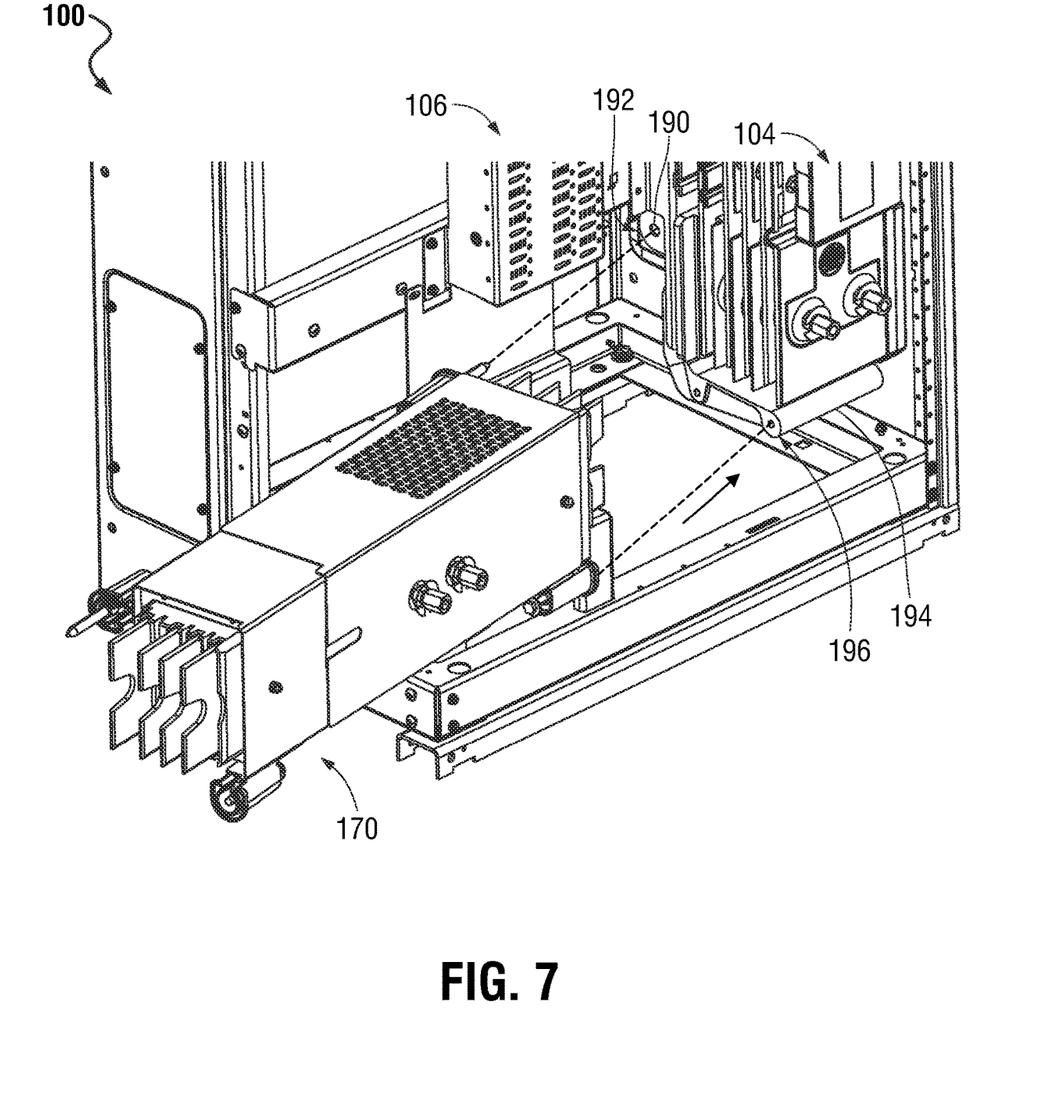
FIG. 7 is a perspective view of a modular switchboard showing installation of the alternative bus bridge according to some implementations of the disclosed embodiments.

FIG. 7 illustrates an exemplary process of installing the bus bridge 170 in the modular switchboard 100. As can be seen, a mounting tab 190 having an alignment hole 192 therein is attached to the modular switchboard 100, for example, to the line bus 104, for receiving the guide pin 180 of the alignment mechanism 178. The mounting tab 190 is positioned within the switchboard 100 such that the bus bridge 170 is considered properly seated within the switchboard 100 when the guide pin 180 is inserted into the alignment hole 192. Similarly, a mounting bracket 194 having a threaded opening 196 therein is attached to the modular switchboard 100 for receiving the screw 186 of the fastening mechanism 184. The mounting bracket 194 is positioned within the switchboard 100 such that the bus bridge 170 is considered properly seated within the switchboard 100 when the screw 186 is screwed into the threaded opening 196.

In some embodiments, although not expressly shown, a mounting tab similar to the mounting tab 190, including a corresponding alignment hole, is provided on the opposite of the line bus 104. This arrangement allows the modular switchboard 100 to receive a bus bridge connection to the line bus 104 on that side. For the same reason, in some embodiments, the mounting bracket 194 has a threaded opening corresponding to the threaded opening 196 on the opposite side thereof.

Figure 8:
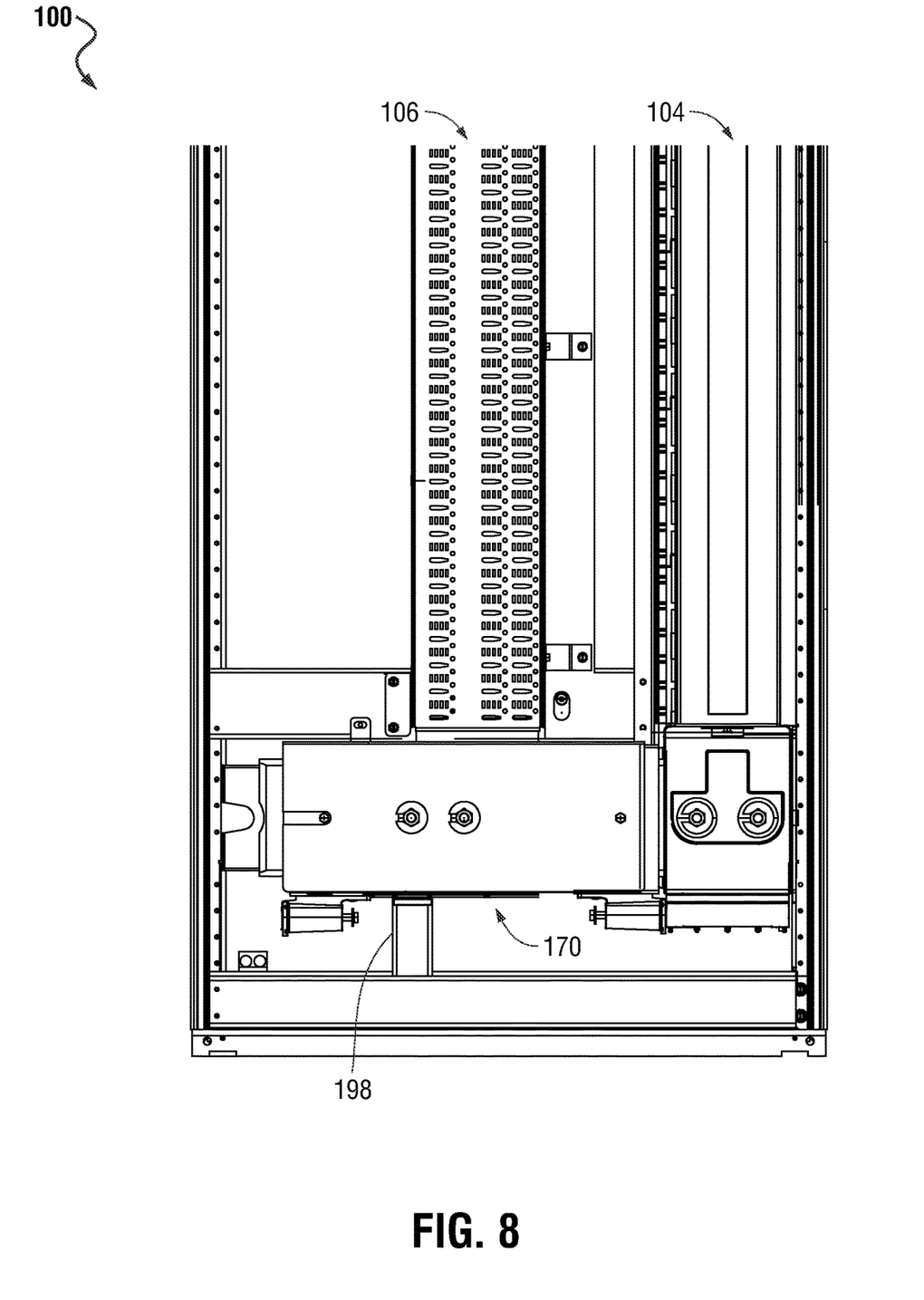
FIG. 8 is a front view of a modular switchboard showing the alternative bus bridge therein according to some implementations of the disclosed embodiments.

FIG. 8 is a front interior view of the modular switchboard 100 with the bus bridge 170 seated therein in some embodiments. As this view shows, the bus bridge 170 rests on a generally rectangular support bar 198 provided in the switchboard 100. Among other things, the support bar 198 provides stability and helps bear the weight of the bus bridge 170.

Figure 9:
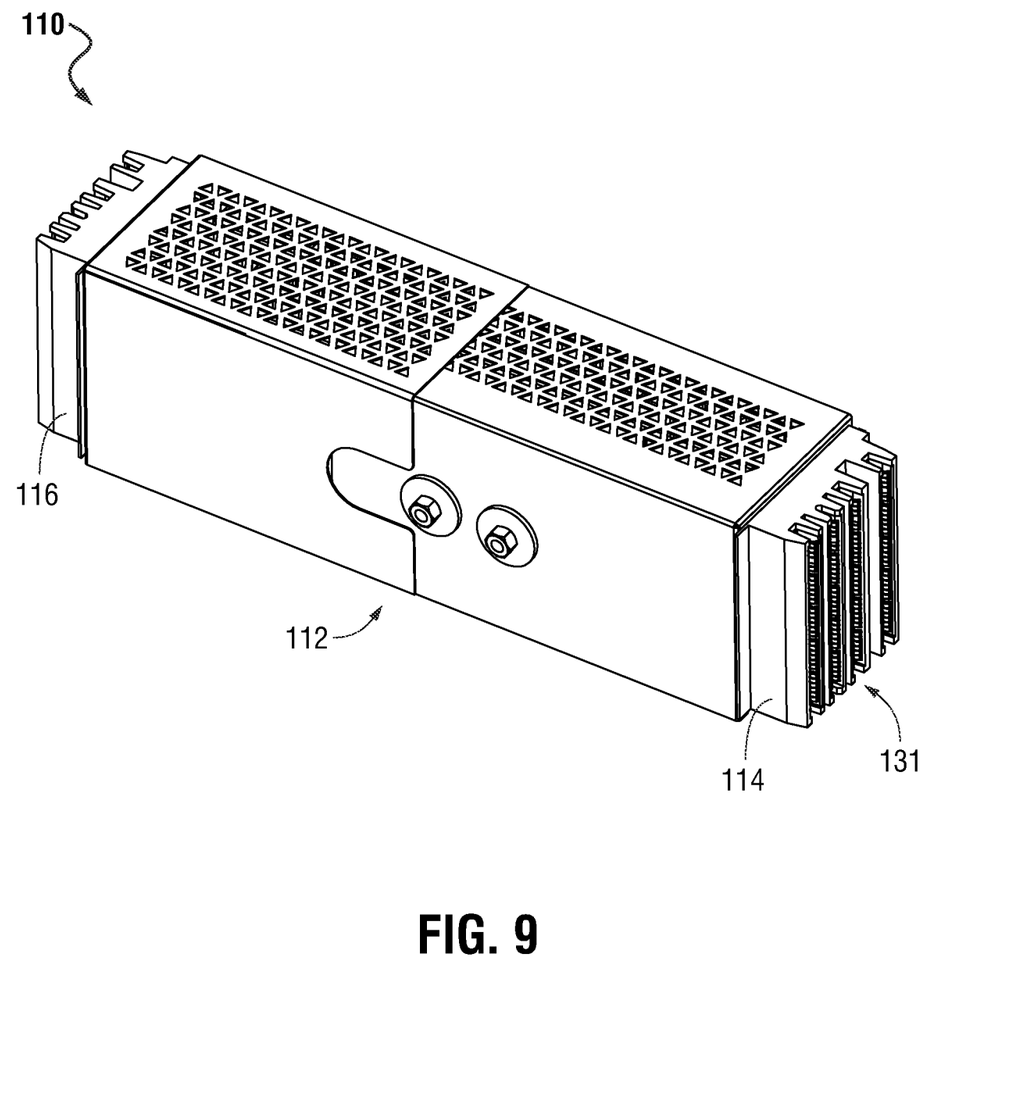
FIG. 9 is a perspective view of the exemplary bus bridge with embedded spring jaws according to some implementations of the disclosed embodiments.

Turning now to FIG. 9, as mentioned above, plug-on busbars are used in some embodiments that employ spring jaws embedded in the insulating shrouds to make the intended connections. In FIG. 9, the first and second insulating shrouds 114, 116 of the adjustable bus bridge 110 each have a spring jaw 131 embedded therein. Such embedded spring jaws 131 are well known in the art and are only described briefly here. In short, the embedded spring jaws 131 provide a plug-on electrical connection by receiving the busbars to which the spring jaws 131 are to be connected into the gap in the embedded spring jaws 131.

Thus far, a number of specific embodiments have been described with respect to an adjustable bus bridge. Following is a method that may be used with the adjustable bus bridge in some embodiments.

Figure 10:
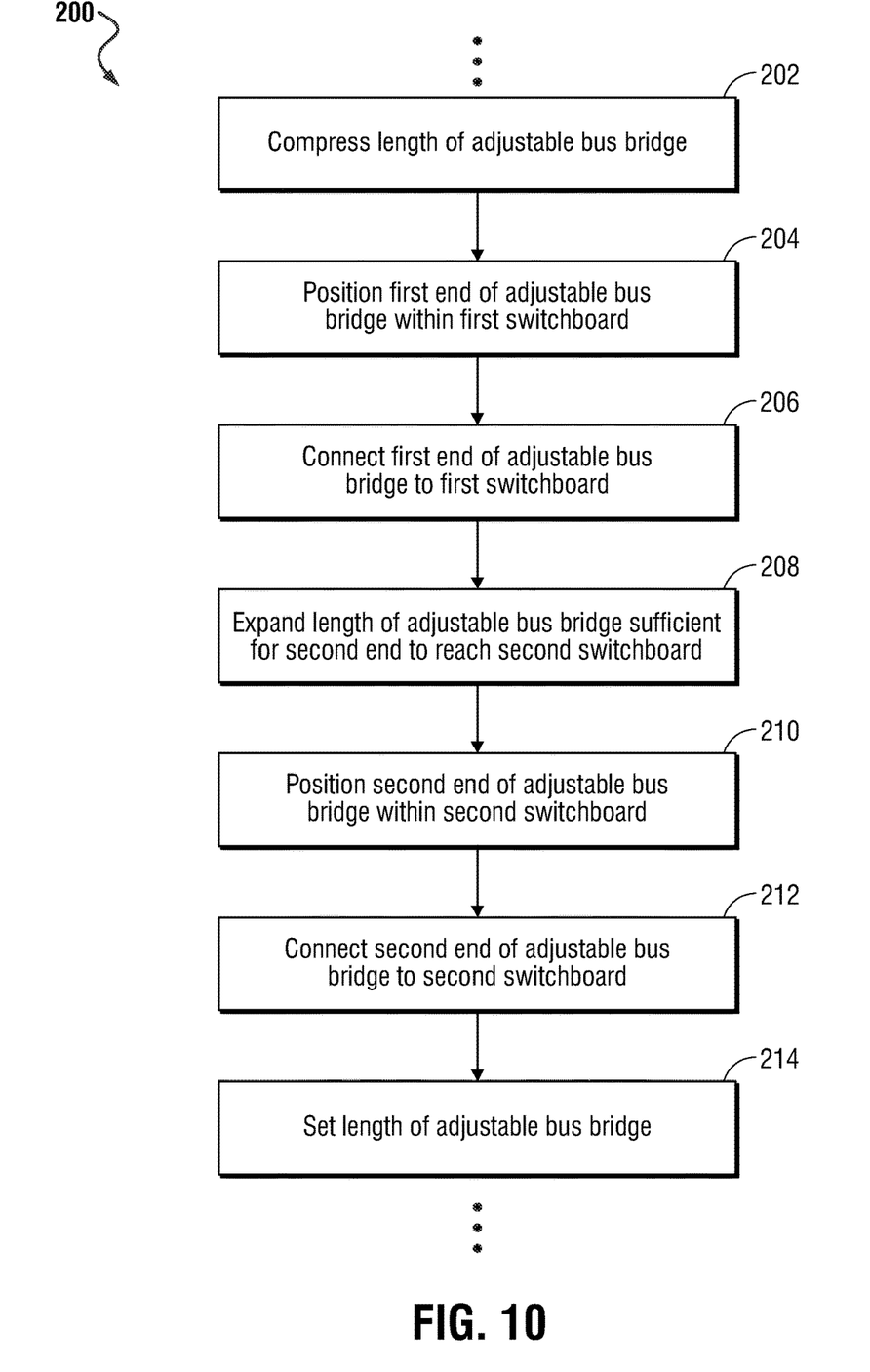
FIG. 10 is a flowchart for a method of using the exemplary bus bridge to connect adjacent switchboards according to some implementations of the disclosed embodiments.

Referring to FIG. 10, a flowchart 200 is shown for method that may be used with the adjustable bus bridge in some embodiments. The method generally begins at 202 where the length of the adjustable bus bridge is compressed by up to a preset minimum for easy handling. This compression may be accomplished, for example, by moving (e.g., pushing) the two housing sections toward one another. At 204, a first end of the adjustable bus bridge is positioned within a first switchboard such that the first connection ends of the busbars therein are in position to establish an electrical connection in the first switchboard (e.g., with a line bus or circuit breaker therein). This positioning may be achieved, for example, by using the alignment mechanism discussed above to align the first end of the adjustable bus bridge within the first switchboard.

At 206, the first end of the adjustable bus bridge is connected to the first switchboard. This connection may be established, for example, by using the fastening mechanism discussed earlier to fasten the first end of the adjustable bus bridge to the first switchboard. Where the bus bridge has plug-on type busbars, the process of fastening the bus bridge via the fastening mechanism also forces the spring jaws of the busbars into the intended connection. On the other hand, where the bus bridge has bolt-on type busbars, an additional step of bolting the connection ends of the busbars to the intended connection is needed.

At 208, the length of the adjustable bus bridge is expanded by up to a preset maximum until a second end of the adjustable bus bridge can reach a second switchboard. This expansion may be accomplished, for example, by moving (e.g., pulling) the two housing sections away from one another. At 210, the second end of the adjustable bus bridge is positioned within the second switchboard such that the second connection ends of the busbars therein are in position to establish an electrical connection in the second switchboard (e.g., with a line bus or circuit breaker therein).

This positioning may be achieved, for example, by using the alignment mechanism discussed above to align the second end of the adjustable bus bridge within the second switchboard.

At 212, the second end of the adjustable bus bridge is connected to the second switchboard. This connection may be established, for example, by using the fastening mechanism discussed earlier to fasten the second end of the adjustable bus bridge to the second switchboard. As before, where the bus bridge has plug-on type busbars, the process of fastening the bus bridge via the fastening mechanism also forces the spring jaws of the busbars into the intended connection. But where the bus bridge has bolt-on type busbars, a further step of bolting the connection ends of the busbars to the intended connection is needed.

At 214, the length of the adjustable bus bridge is set by tightening one or more nuts on a sliding joint of the bus bridge to prevent unintended shifts in the length of the bus bridge. The nuts may be conventional bolt nuts, or they may be torque-controlled nuts similar to the VISI-TITE® nuts mentioned earlier. To uninstall the bus bridge, for example, when maintenance needs to be performed or changes need to be made, the same method described above may be followed in reverse sequence.

While particular aspects of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A bus bridge for electrically connecting adjacent electrical distribution devices, comprising:
    an adjustable length housing having a first housing section and a second housing section configured to slide toward and away from each other when assembled;
    a plurality of adjustable length phase members housed within the adjustable length housing, each adjustable length phase member spaced apart and parallel to an immediately adjacent adjustable length phase member and including a first busbar and a second busbar; and
    an insulation barrier positioned in between adjacent adjustable length phase members, the insulation barrier electrically isolating the adjacent adjustable length phase members from one another;
    wherein the plurality of adjustable length phase members has a length that is adjustable by up to a predefined minimum amount and a predefined maximum amount; and
    wherein one of the first housing section or the second housing section is configured to slide back and forth together with one of the first busbar or the second busbar of the plurality of adjustable length phase members.

2. The bus bridge of claim 1, wherein the first and second busbars are configured to slide relative to one another to adjust a length of the adjustable length phase member.

3. The bus bridge of claim 2, wherein the first busbar and the second busbar each have a connection end and an interior end, and the interior end of the first busbar and the interior end of the second busbar overlap as the first and second busbars slide relative to one another.

4. The bus bridge of claim 3, further comprising a bend between the connection end and the interior end in either the first busbar or the second busbar, the bend allowing the connection end of the first busbar and the connection end of the second busbar to be coplanar.

5. The bus bridge of claim 3, further comprising at least one through bolt extending through a middle region of said each adjustable length phase member where the interior ends of the first and second busbars overlap.

6. The bus bridge of claim 5, further comprising a longitudinally extending slot formed in at least one of the first and second busbars, wherein the at least one through bolt extends through the longitudinally extending slot.

7. The bus bridge of claim 5, wherein the middle region of said each adjustable length phase member and the at least one through bolt form a sliding joint within the bus bridge.

8. The bus bridge of claim 1, wherein the one of the first housing section or the second housing section is configured to cause the first busbar or the second busbar of the plurality of adjustable length phase members to slide back and forth together with the one of the first housing section or the second housing section.

9. A modular electrical distribution device for distributing electrical power in a facility, comprising:
    a generally rectangular frame;
    a line bus attached to the generally rectangular frame; and
    a bus bridge connected to the line bus, wherein the bus bridge has a length that is adjustable by up to a predefined minimum amount and a predefined maximum amount;
    wherein the bus bridge comprises a housing having a first housing section and a second housing section that slide relative to one another to adjust the length of the bus bridge, and a plurality of phase members housed within the housing, each phase member having a first busbar and a second busbar; and
    wherein sliding one of the first housing section or the second housing section back and forth also slides one of the first busbar or the second busbar of the plurality of adjustable length phase members back and forth together with one of the first housing section or the second housing section.

10. The modular electrical distribution device of claim 9, wherein the first busbar and the second busbar are configured to slide relative to one another to adjust the length of the bus bridge.

11. The modular electrical distribution device of claim 9, further comprising at least one alignment mechanism provided on the housing, the at least one alignment mechanism ensuring proper alignment of the bus bridge within the modular electrical distribution device.

12. The modular electrical distribution device of claim 9, further comprising at least one fastening mechanism provided on the housing, the at least one fastening mechanism ensuring secure fastening of the bus bridge to the modular electrical distribution device.

13. The modular electrical distribution device of claim 9, further comprising a longitudinally-extending open-ended slot formed in either the first housing section or the second housing section and sized to receive a through bolt of the bus bridge when the first and second housing sections slide relative to one another.

14. A method of electrically connecting adjacent electrical distribution devices, comprising:
    connecting a bus bridge to a first electrical distribution device;
    adjusting a length of the bus bridge sufficient to reach a second electrical distribution device adjacent to the first electrical distribution device; and connecting the bus bridge to the second electrical distribution device;
wherein the bus bridge comprises:
an adjustable length housing having a first housing section and a second housing section configured to slide toward and away from each other when assembled;
a plurality of adjustable length phase members housed within the adjustable length housing, each adjustable length phase member spaced apart and parallel to an immediately adjacent adjustable length phase member; and
an insulation barrier positioned in between adjacent adjustable length phase members, the insulation barrier electrically isolating the adjacent adjustable length phase members from one another;
wherein each adjustable length phase member includes a first busbar and a second busbar that slide relative to one another within the adjustable length housing, and one of the first housing section or the second housing section is configured to slide back and forth together with one of the first busbar or the second busbar of the plurality of adjustable length phase members.

15. The method of claim 14, wherein the first and second busbars are configured to slide relative to one another to adjust the length of the bus bridge.

16. The method of claim 15, wherein the first busbar and the second busbar each have a connection end and an interior end, and the interior end of the first busbar and the interior end of the second busbar overlap as the first and second busbars slide relative to one another.

17. The method of claim 16, further comprising providing a bend between the connection end and the interior end in either the first busbar or the second busbar, the bend allowing the connection end of the first busbar and the connection end of the second busbar to be coplanar.

18. The method of claim 16, further comprising extending at least one through bolt through a middle region of said each adjustable length phase member where the interior ends of the first and second busbars overlap.

19. The method of claim 18, further comprising providing a longitudinally extending slot formed in at least one of the first and second busbars, wherein the at least one through bolt extends through the longitudinally extending slot.

20. The method of claim 18, wherein the middle region of said each adjustable length phase member and the at least one through bolt form a sliding joint within the bus bridge.

* * * * *